United States Patent [19]

Billard

[11] 4,283,223
[45] Aug. 11, 1981

[54] PROCESS FOR TREATING SMOKE FROM STEEL PLANTS

[75] Inventor: François Billard, Paris, France

[73] Assignee: Air Industrie, Courbevoie, France

[21] Appl. No.: 78,182

[22] Filed: Sep. 24, 1979

[30] Foreign Application Priority Data

Oct. 9, 1978 [FR] France .............................. 78 28961

[51] Int. Cl.³ .............................................. C21B 3/04
[52] U.S. Cl. ............................................. 75/25; 55/6;
55/97; 55/98; 55/82; 75/77; 75/88; 55/72;
55/269
[58] Field of Search .................. 55/5, 6, 9, 82, 97–99,
55/124–126, 267, 268, 269, 315, 479, 341, 474,
72; 75/14, 88, 77, 25, 63; 266/155–159

[56] References Cited

U.S. PATENT DOCUMENTS

| 1,301,373 | 4/1919 | Briggs .................................. 55/474 |
| 2,002,860 | 5/1935 | Levy ....................................... 55/6 |
| 3,395,512 | 8/1968 | Finney, Jr. et al. ..................... 55/97 |
| 3,731,910 | 5/1973 | Butler ................................. 266/157 |
| 3,756,804 | 9/1973 | Stevenson ............................. 75/25 |
| 3,945,817 | 3/1976 | Yatsunami et al. ..................... 75/25 |

FOREIGN PATENT DOCUMENTS

| 143410 | 5/1960 | U.S.S.R. .................................. 55/97 |
| 370241 | 4/1973 | U.S.S.R. ................................ 266/157 |

*Primary Examiner*—Bernard Nozick
*Attorney, Agent, or Firm*—Larson and Taylor

[57] ABSTRACT

A process for treating smoke from steel plants coming from blast furnaces, electric furnaces, converters and cupola furnaces.

The process of the invention consists first of all in separating, when hot, the iron and iron oxide dust from the smoke by contact with solid particles, then in cooling this smoke to solidify the non-ferrous metal vapors which they contain, then finally in separating the solidified non-ferrous metals.

It is possible to recover for a smaller cost, on the one hand, the iron and iron oxide dust and, on the other hand, the non-ferrous metals in solid form. Heat may also be recovered.

6 Claims, 1 Drawing Figure

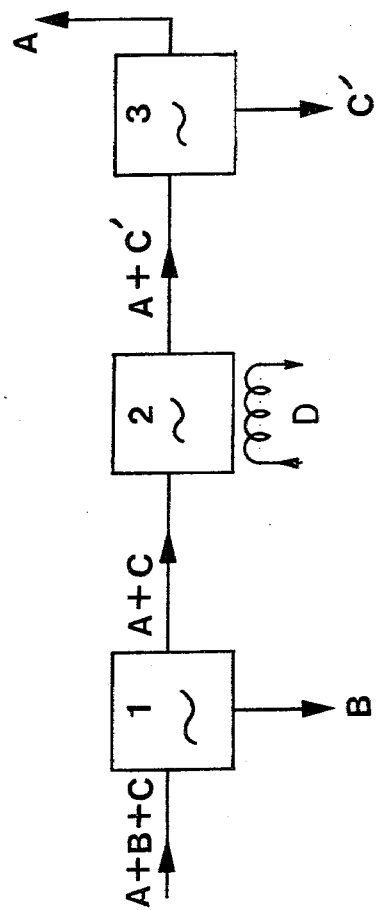

PROCESS FOR TREATING SMOKE FROM STEEL PLANTS

The present invention relates to a process for treating smoke from steelworks, and particularly smoke from blast furnaces, electric furnaces, converters, or cupola furnaces.

It also relates to the installation for implementing this process.

Smoke from steelworks are constituted generally of a reducing carrier gas formed, in particular, by carbon dioxide, carbonic gas, methane and hydrogen, iron dust and different iron oxides. This smoke often contains non-ferrous metals, such as, for example zinc and lead.

Since the temperature of this smoke is very high (greater than 1000° C.), these non-ferrous metals are in the form of vapor mixed with the reducing carrier gas.

Of course, this smoke from steelworks highly charged with iron and iron oxide dust, cannot be discharged directly into the atmosphere, because of the pollution which this discharge would cause.

This is why, recovery of the dust is carried out before discharging the smoke into the atmosphere.

This recovery of the dust is, in a way known per se, effected first of all by removing the dust by means of a wet process, for example by spraying water into the smoke, then by electrostatic collection in electrofilters or electrostatic dust removers. This technique of collection by a wet process causes a lowering of the temperature of the smoke so that the non-ferrous metal vapors contained in this smoke are solidified. So there is then mixing of the iron and iron oxide dust and solid non-ferrous metals.

Thus, after dust removal by means of a wet process and by collecting the finest particles electrostatically, we obtain on the one hand, the carrier gas which may be discharged into the atmosphere and, on the other hand, dust formed from iron and iron oxides and non-ferrous metals.

Since the non-ferrous metal content is relatively small, the separation, in the solid phase, of non-ferrous metals, iron and iron oxides, is not at present carried out because of the high cost price of the process for separating from material in solid phases.

Since this iron and iron oxide and non-ferrous metal dust is not separated, it cannot be used and is stocked in dumps harmful to the environment.

The present invention has as an aim to remedy these disadvantages and relate to a process for treating smoke from steelworks formed, in particular, by a carrier gas, iron and iron oxide dust and non-ferrous metals in the form of vapor characterized in that the iron and iron oxide dust is separated when hot, the carrier gas and the non-ferrous metal vapors are cooled and the solidified non-ferrous metals are separated from the carrier gas.

With this invention, we can recover on the one hand, the iron and iron oxide dust at the time of their hot separation from the smoke and, on the other hand, the non-ferrous metals at the time of their separation after solidification by cooling. Thus the separated iron and iron oxides on the one hand and the non-ferrous metals on the other can be reused.

Other characteristics of the invention reside in the fact that
the hot separation of the iron and iron oxide dust is achieved by direct contact with solid particles,
the cooling of the carrier gas and the non-ferrous metal vapors is achieved by indirect contact with a fluid.

The present invention concerns furthermore an installation for implementing said process. Such an installation may be characterized in that it comprises at least a first device for separating, when hot, the iron and iron oxide dust, at least one cooling device and at least one second device for separating the solidified non-ferrous metals.

Other characteristics and advantages will appear during the following description:

In the accompanying drawing, given solely by way of example:

The single FIGURE is a schematical representation of the process of the invention.

One example of a process according to the invention consists in treating smoke coming from a steelworks converter.

This high-temperature smoke, generally above 1000° C., is constituted in particular of carbon oxide, carbonic gas, methane, hydrogen forming the reducing carrier gas A, dust B from iron and different iron oxides such as for example $FeO$, $Fe_2O_3$, $Fe_3O_4$, and non-ferrous metal vapors C, such as zinc and lead.

According to the example shown in the single FIGURE, this smoke is brought to a first hot separating device 1 where the iron and different iron oxide dusts are separated from the carrier gas and from the non-ferrous metal vapors. This carrier gas A and these vapors C are then cooled by indirect contact with a fluid D, such as water, in a cooling or heat exchange device 2.

The smoke from the cooling device, at a temperature less than 325° C., is formed by the reducing carrier gas A and non-ferrous metals C' in solid form. This smoke is then brought to a second cold separating device 3 where the non-ferrous metals C' are separated from the carrier gas A. Thus, the carrier gas A may be discharged to the atmosphere or re-used as a combustion gas.

Thus, at the time of the first separation, hot, the iron and iron oxide dust is recovered whereas in the second separation, cold, the non-ferrous metals are recovered in solid form.

The first separating device 1, hot, may be a device for collecting smoke, in which the smoke is contacted with solid particles, these particles collecting the iron and iron oxide dust.

The cooling or heat exchange device 2 may be advantageously a tube or plate heat exchanger in which the carrier gas is brought into contact with a wall cooled by fluid D. There is then no direct contact between fluid D and the smoke.

The second cold separating device may advantageously be a sleeve filter or an electrostatic dust remover (or electrofilter).

With the invention, we succeed in obtaining in a simple way selective collection of the products contained in the smoke from steel plants. Thus it is that while avoiding the discharge of polluting smoke into the atmosphere, on the one hand iron and iron oxide dust is recovered and, on the other hand, non-ferrous metals.

This iron and iron oxide dust may then be used directly or by aglomerating them in steel furnaces.

The non-ferrous metals, in solid form, are also easily re-usable.

The first hot separation of the iron oxide dust allows an indirect contact heat exchanger to be used for cooling, for this dust, already eliminated, cannot be deposited against the walls of this exchanger. Thus, fluid D, water for example, since it is not in contact with the smoke, recovers the heat released by the smoke during the cooling thereof. This heat may be brought to a place of use by the cooling fluid.

The process of the invention may be applied and implemented in particular in steel plants, for treating reducing smoke from blast furnaces, electric furnaces, converters or cupola furnaces.

As is evident and as it follows from what has gone before, the invention is in nowise limited to those of the modes of application and embodiment which have been more specially considered; it embraces, on the contrary, all variations thereof.

I claim:

1. A method for treating smoke from steel plants, said smoke comprising a carrier gas, iron and iron oxides dust and non-ferrous metals in vapor form, said smoke being at a temperature higher than the vaporization temperature of said non-ferrous metals, said method comprising the following steps, in sequence:

effecting, while the smoke is in the hot state, without noticeable cooling thereof, a first, dry separation between, on the one hand, said iron and iron oxides dust and, on the other hand, said carrier gas mixed with said non-ferrous metals in vapor form;

cooling said carrier gas and non-ferrous metals to a temperature lower than the solidification temperature of the non-ferrous metals so as to produce cooling of said carrier gas and solidification of said non-ferrous metals; and effecting a second separation, between the cooled carrier gas and the solidified non-ferrous metals.

2. A method according to claim 1, characterized in that said first separation is carried out by direct contact with solid particles.

3. A method according to claim 1, characterized in that the cooling of the carrier gas is carried out by indirect contact with a cooling fluid.

4. A method according to claim 3, characterized in that the heat produced by the cooling step is recovered.

5. A method according to claim 1, characterized in that said second separation is carried out in a sleeve filter.

6. A method according to claim 1, characterized in that said second separation is carried out in an electrostatic dust remover.

* * * * *